July 4, 1972  S. BAUMGÄRTNER ET AL  3,674,408
MOLDING MACHINE FOR FOAM-PLASTIC ARTICLES
Filed June 5, 1970  3 Sheets-Sheet 1

SIEGFRIED BAUMGÄRTNER
BERND FRIES
ROLF LIDL
GÜNTER ZIPPE
INVENTORS.

BY
Karl F. Ross
ATTORNEY

SIEGFRIED BAUMGÄRTNER
BERND FRIES
ROLF LIDL
GÜNTER ZIPPE
INVENTORS.

BY
Karl F. Ross
ATTORNEY

FIG.6
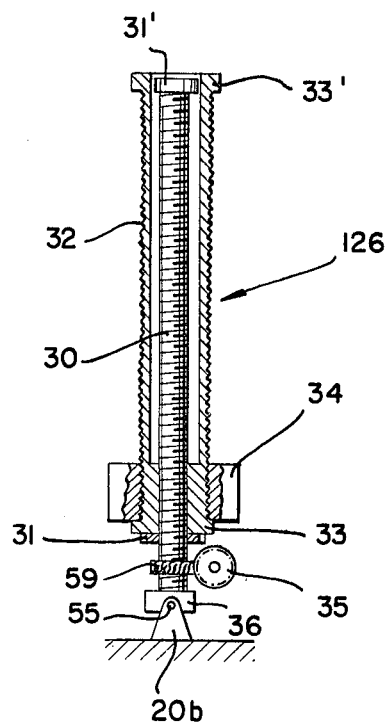
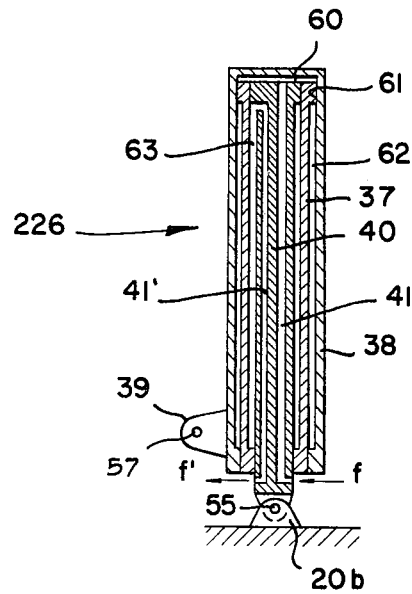
FIG.7
SIEGFRIED BAUMGÄRTNER
BERND FRIES
ROLF LIDL
GÜNTER ZIPPE
INVENTORS.
BY
Karl F. Ross
ATTORNEY United States Patent Office 3,674,408
Patented July 4, 1972

3,674,408
MOLDING MACHINE FOR FOAM-PLASTIC
ARTICLES
Siegfried Baumgärtner, Sixtnitgern, Bernd Fries, Volkach, and Rolf Lidl and Günter Zippe, Munich, Germany, assignors to Krauss-Maffei Aktiengesellschaft, Munich, Germany
Filed June 5, 1970, Ser. No. 43,801
Claims priority, application Germany, June 6, 1969,
P 19 28 780.0
Int. Cl. B29s 3/02
U.S. Cl. 425—406                    10 Claims

ABSTRACT OF THE DISCLOSURE

The halves of a split mold to be filled with foamable polymeric material are supported on a frame carrying a hydraulic or pneumatic jack for opening and closing the mold, the frame being swingable through at least 90° about an axis transverse to the direction of mold movement to allow for a positioning of portions of the parting line of the mold halves at different levels facilitating the escape of gases trapped in pockets of the mold cavity or cavities. For the same purpose, the mold halves are also adjustably positioned on the frame in a manner enabling their rotation—continuous or in steps—through a similar angle about an axis extending in the direction of mold movement.

---

Our present invention relates to a molding machine of the type used to produce articles of foamed polymeric material (natural rubber or synthetic resin).

In such machines it is customary to introduce the foamable polymeric substance into the cavity or cavities of a split mold, in a quantity allowing for the necessary expansion, and to fill the remainder of the interior of the mold with a foaming agent. Upon the subsequent closure of the mold and interaction of the constituents, evolving gases must be evacuated. In many instances this is possible by simply letting these gases escape along the parting line of the relatively movable members of the closed mold; with more intricate cavity configurations, however, upwardly closed gas pockets are likely to form which would require special exhaust ducts or risers for their evacuation. Naturally, the fit of the members along the parting line must be sufficiently tight to prevent the escape of liquefied molding material from the closed mold.

It is, therefore, the general object of our present invention to provide a molding machine for the purpose described in which the removal of trapped gases is facilitated without the need for complicated internal channel systems requiring constant inspection and cleaning.

More specifically, our invention aims at providing a molding machine in which portions of the parting line between two relatively movable members (hereinafter referred to as mold halves) can be positioned at different levels as needed to let trapped gases rise from any part of the mold cavity or cavities.

These objects are realized, pursuant to our present invention, by the provision of a mold support which is rotatable on a base, through an angle of at least 90°, about a swing axis perpendicular to the direction of mold opening and closure, i.e. to the line of reciprocation of either or both mold halves. Such reciprocation is effected, in a manner known per se, by an actuating mechanism mounted on the swingable mold support, preferably a fluid-operated (hydraulic or pneumatic) ram in line with a second axis about which the mold half can also be rotated through an arc of at least 90°, either continuously or in steps. With this adjustability of the mold halves, and therefore of their parting line, about two mutually orthogonal axes, any part of even the most intricately shaped mold cavity can be vented during the molding process so that the gases will not be trapped in any pocket and the cavity will be completely filled with the cellular polymeric material.

For this purpose it will generally be sufficient to make the closed mold rotatable only in a plane perpendicular to the parting line, i.e. a plane transverse to the first-mentioned axis, and to provide adjustable mounting means enabling a selection of a suitable angular position with reference to the other axis (i.e. the one parallel to the direction of reciprocation) only prior to mold closure.

In an advantageous embodiment, the mold support is a frame cradled on its base with the aid of one or more sets of gear teeth disposed along its circularly curved periphery and engaged by one or more pinions journaled on the base, there being perferably two such pinions contacting the frame at peripherically spaced locations to dispense with the need for additional bearing means.

A frame-type support may also be hinged to the base for rotation about a horizontal swing axis, either manually or by automatic means. In the first instance it will be convenient to let the swing axis pass through the common center of gravity of the frame and the mold to minimize the effort required; in the second instance, allowing for a more stable construction, the horizontal swing axis may be located at one end of the frame while an operating device engages its other end to raise or lower it with reference to the base. This operating device may comprise an electrically, hydraulically or pneumatically operable jack articulated to both the base and the frame; advantageously, for the realization of a compact structure swingable through the desired angle of 90° or more, this jack may include at least three nestled elements engaging one another for relative longitudinal displacement.

The above and other features of our invention will be described in detail hereinafter with reference to the accompanying drawing in which:

FIG. 6 shows in axial section a jack adapted to be used in the system of FIGS. 4 and 5; and FIG. 7 is a view similar to FIG. 6, showing a modified jack.

Figure 1:
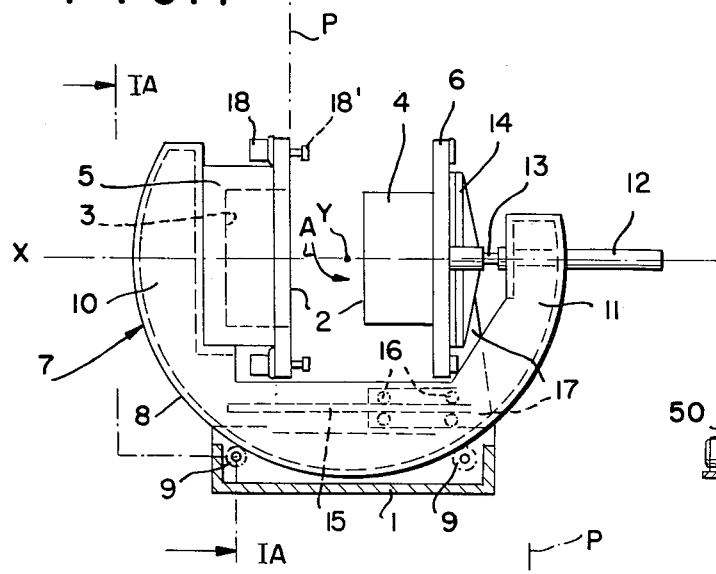
FIG. 1 is a side-elevational view, partly in section, of a molding machine embodying our invention.
Figure 1A:
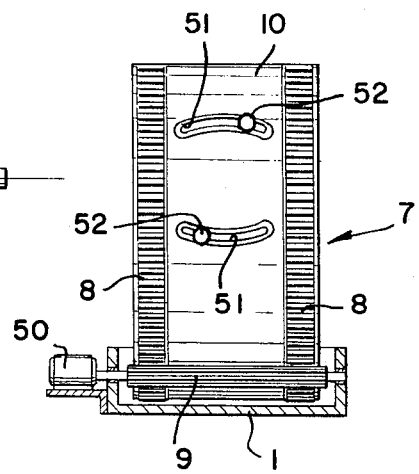
FIG. 1A is a partly sectional end view taken on the line IA—IA of FIG. 1.

In FIGS. 1 and 1A we have shown a molding machine with a base 1 in which a split mold 2, consisting of two confronting halves 5 and 6 respectively formed with a cavity 3 and a core 4, is supported on a frame 7 having the outline of a cylinder segment extending over roughly 225°. The cylinder is cut out around its axis Y to accommodate the mold 2 whose left-hand half 5 (as viewed in FIG. 1) is fixedly, albeit adjustably, secured to an upright jaw 10 forming part of the frame 7; a similar jaw 11 carries the right-hand mold half 6 which is reciprocable along an axis X toward and away from the confronting mold half 5 under the control of a piston 13 slidable in a hydraulic or pneumatic cylinder 12. The free end of piston 13 carries a mounting plate 14 which is thus movable with reference to jaw 11, rigid with cylinder 12, and forms an extension of a carriage 17 slidably guided, with the aid of rollers 16, on a pair of horizontal rails 15 disposed along two inner wall surfaces of frame 17.

The circularly curved outer periphery of frame 7 carries two sets of gear teeth 8 in mesh with a pair of elongate pinions 9 which are journaled in base 1 to sustain the weight of frame 7 and mold 2. One or both of these pinions can be rotated with the aid of a reversible electric motor 50 to change the attitude of the frame, i.e. to incline the axis X in one sense or the other with reference to the horizontal. Such rotation, about axis Y, also changes the position of a plane P, perpendicular to axis X, which is the locus of the parting line of mold halves 5 and 6 when the mold is closed by extension of piston 13. Latches 18', operable in conventional manner by a hydraulic servomotor 18, help maintain the mold 2 in its closed position for the time necessary to cure the polymeric material within cavity 3 and to volatilize the foaming agent therein in order to form the desired cellular structure. Since the mold halves 5 and 6 do not close in a completely fluidtight manner, the evolving gases can escape along that parting line. To facilitate this escape, motor 50 can be energized either before or after mold closure to swing the frame 7 about axis Y (arrow A) in order that any blind branch of the cavity should come to rest below the plane P with its open end rising toward that plane. If there are several such cavity branches extending in different directions, the position of the frame 7 may be correspondingly altered during the curing stage to allow for a complete venting.

As indicated in FIG. 1A, jaw 10 is provided with a pair of arcuate slots 51 of T-profile accommodating the heads of bolts 52 screwed into mold half 5. These slots are long enough to let the mold half 5 be rotated about axis 5 through an arc of at least 90° and to be fastened in any position along this arc by a tightening of bolts 52. Similar adjustment means, not shown, are provided on plate 14 for mold half 6 so that the relative alignment of the two halves may be preserved. Instead of continuous slots 51, angularly spaced holes for the bolts 52 may be provided if only a limited number of positions (e.g. 15° apart) are needed for the mounting of different molds.

The polymeric material and its foaming agent may be introduced by injection or other means into the mold cavity 3 after or prior to closure.

Figure 2:
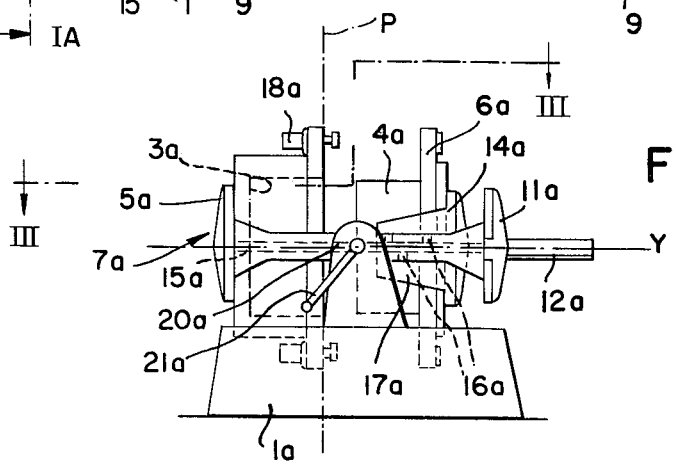
FIG. 2 is a side-elevational view of another embodiment.
Figure 3:
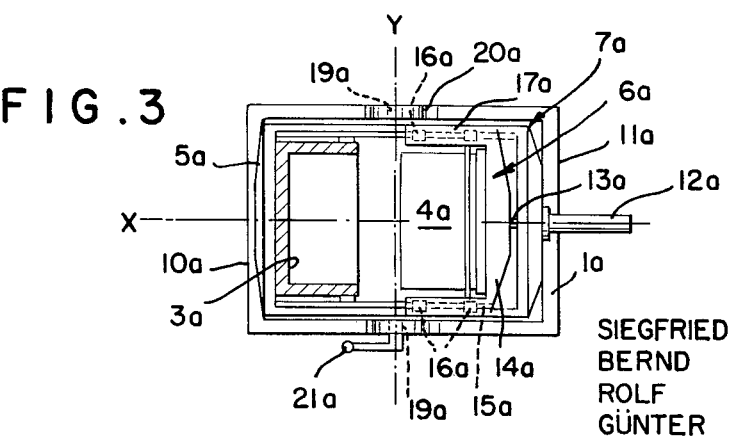
FIG. 3 is a top view, partly in section, taken on the line III—III of FIG. 2.

In FIGS. 2 and 3, elements corresponding to those of FIG. 1 have been designated by the same reference numerals followed by the suffix a. Mold support 7a has the shape of a rectangular frame lying in a plane perpendicular to plane P which marks the parting line between mold halves 5a and 6a. These mold halves are supported, in the aforedescribed adjustable manner, on end members 10a and 11a of the frame 7a with interposition of a piston-supported mounting plate 14a in the case of mold half 6a. Frame 7a has a pair of centrally positioned gudgeons 19a journaled in lugs 20a, rising from base 1a, whereby the frame can be swung about horizontal axis Y which passes through the center of gravity of the frame as loaded by the mold. A handle 21a rigid with one of these gudgeons allows for the manual adjustment of the inclination of frame 7a.

Figure 4:
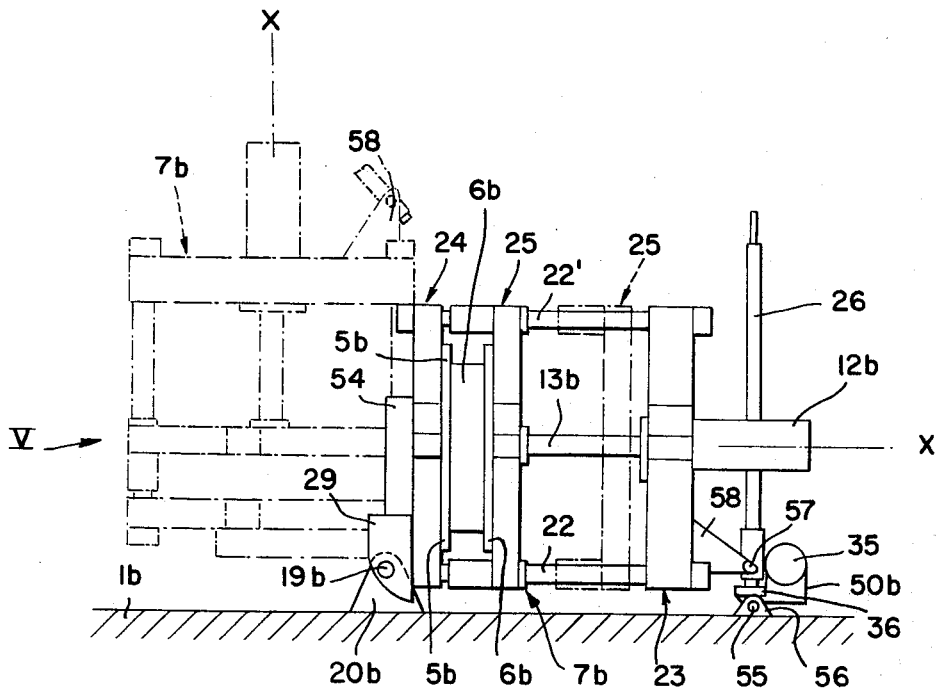
FIG. 4 is a view similar to FIG. 2, illustrating a further modification.
Figure 5:
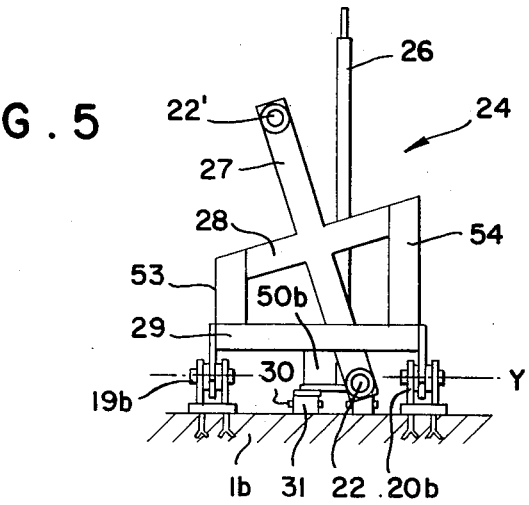
FIG. 5 is an end view of the machine of FIG. 4 as seen in the direction of arrows V.

In FIGS. 4 and 5 we have shown a modified frame 7b which is articulated to base 1b at one end 24 with the aid of gudgeons 19b traversing a pair of lugs 20b along axis Y. As best seen in FIG. 5, frame end 24 comprises two orthogonally intersecting arms 27, 28 secured by uprights 53, 54 to a yoke 29 carrying the gudgeons 19b. The opposite end 23 of frame 7b, which is similarly constructed, is connected with end 24 by a pair of tie bars 22, 22' spanning the lower and upper extremities of the longer arm 27. It will be noted that the cross formed by these arms is somewhat inclined so that the two tie bars are horizontally offset from each other, and from the mold-reciprocating piston 13b for easier accessibility by an overhead crane or hoist that may be used for the transportation of the assembly. A similar cross 25, slidably guided on tie bars 22 and 22' but rigid with piston 13b, serves as a carrier for the mobile mold half 6b which in FIG. 4 is shown in engagement with stationary mold half 5b; the two mold halves are adjustably mounted on crosses 24 and 25, as described above, for a change of their angular position about axis X.

An extensible operating member 26, i.e. a multiple jack such as those described hereinafter with reference to FIGS. 6 and 7, is articulated at 55 to a set of lugs 56 rigid with base 1b and at 57 to lugs 58 extending from frame end 23. Extension of jack 26 separates the pivots 55 and 57 from each other until the frame 7b reaches a piston, shown in dot-dash lines in FIG. 4, in which its main axis X is vertical instead of horizontal. Naturally, the frame may also be arrested in any intermediate position between these two extremes.

A multiple jack, extensible to about double its original length illustrated in FIGS. 4 and 5, has been shown at 126 in FIG. 6. This jack comprises an inner spindle 30 threadedly engaging a surrounding, externally threaded tube 32 which is longitudinally displaceable between a lower and an upper stop 31, 31'. A third relatively displaceable element, i.e. a nut 34, is in mating engagement with tube 32 for displacement therealong between bottom and top stops 33, 33'. The lower end of spindle 30 is rotatable in a head 36 carrying the gudgeon 55 (cf. FIG. 4); this end is also rigid with a worm gear 59 driven by a worm 35 under the control of a reversible motor 50b (FIGS. 4 and 5). Nut 34, in turn, carries the gudgeon 57 (FIG. 4) articulating it to lugs 58.

With the pitch of the thread of spindle 30 less than that of the outer thread of tube 32, rotation of the spindle by motor 50b will at first raise the tube 32 from the bottom position of FIG. 5 until that tube strikes the stop 31'; further rotation of members 30 and 32 in unison will then elevate the nut 34.

FIG. 7 shows a generally similar jack 226 with a central piston 40 hinged to the base at 55 and two nested cylinders 37, 38 slidably surrounding that piston. A channel 41 within the piston allows for the introduction of a hydraulic or pneumatic fluid (arrow f) into a space 60 to raise the outer tube 38 with reference to the inner tube 37 until it strikes a stop 61; the intervening space 62 is vented to the atmosphere at one or more points not shown. Upon a further admission of hydraulic fluid into channel 41, the two nested tubes 37, 38 are raised jointly along piston 40, with the air in an intervening space 63 escaping through a channel 41' to the bottom of the piston (arrow f'). The outer tube 38 is articulated at 39, via a pin 57, to the lug 58 of FIG. 4.

Jack 226 can be collapsed under the weight of the frame, upon a venting of space 41, or by the forced admission of fluid into spaces 41', 62.

The multiple jacks 126, 226 shown in FIGS. 6 and 7 allow the pivotal axis of the operating element, defined by gudgeon 55, to be located outside the frame 7b for easier access to the mold.

We claim:

1. A machine for the production of articles of foamed polymeric material, comprising:
    a base;
    a mold support rotatable on said base about a swing axis through an angle of at least 90°;
    a slit mold including a first and a second mold member confrontingly mounted on said support for movement toward and away from each other in a direction perpendicular to said axis; and
    actuating means on said support for relatively displacing said mold members in said direction to close and open the mold, said mold members upon closure of the mold being joined along a gas-penetrable parting line with portions positionable at different levels by rotation of said support about said axis for facilitating the escape of gases trapped in various parts of a cavity of said mold filled with polymeric substance and a foaming agent, said support being provided with spaced-apart carriers for said mold members adjustably mounted on said support for rotation into different positions centered on another axis parallel to said direction.

2. A machine as defined in claim 1 wherein said actuating means comprises a fluid-operated ram in line with said other axis.

3. A machine as defined in claim 1 wherein said support comprises a frame with a circularly curved periphery centered on said swing axis, said base forming a cradle for said frame and being provided with drive means engageable with said periphery for rotating said frame.

4. A machine as defined in claim 3 wherein said frame is provided with gear teeth along said periphery, said base having a plurality of pinions engaging said gear teeth at peripherally spaced locations, said drive means being coupled with at least one of said pinions.

5. A machine as defined in claim 1 wherein said support comprises a frame with a horizontal line of symmetry coinciding with said swing axis and passing through the combined center of gravity of said frame and said mold.

6. A machine as defined in claim 1 wherein said support comprises a frame with an end hingedly joined to said base for swinging about a horizontal line representing said axis, further comprising operating means engaging another end of said frame for raising and lowering same with reference to said base.

7. A machine as defined in claim 6 wherein the ends of said frame are formed by respective pairs of intersecting arms, said frame further including at least two longitudinal bars interconnecting corresponding extremities of one arm of each pair.

8. A machine as defined in claim 7 wherein said one arm of each pair is inclined at an acute angle to the vertical with relative horizontal offsetting of said bars.

9. A machine as defined in claim 7 wherein said operating means comprises a jack articulated to said base and to said frame.

10. A machine as defined in claim 9 wherein said jack is an assembly of at least three nested elements engaging one another for relative longitudinal displacement.

References Cited

UNITED STATES PATENTS

| | | | |
|---|---|---|---|
| 2,699,574 | 1/1955 | Gilbert | 18—20 RR |
| 3,334,379 | 8/1967 | Settembrini | 18—20 RR X |

ROBERT L. SPICER, Jr., Primary Examiner

U.S. Cl. X.R.

18—16 H, 16.5; 425—4, 817